Figure 1:
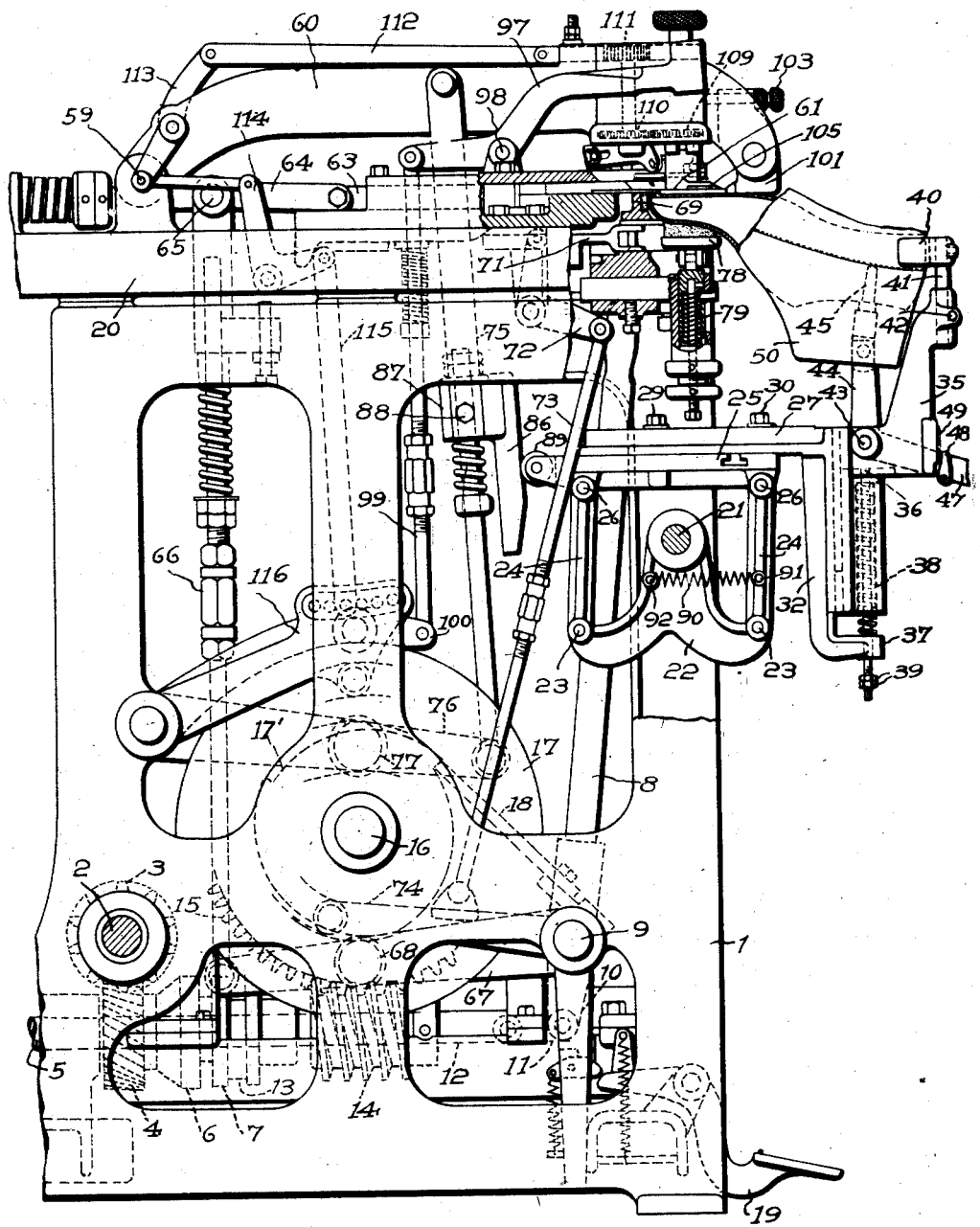

Feb. 19, 1929.                                           1,702,397
W. C. BAXTER
MACHINE FOR SHAPING UPPERS OVER LASTS
Original Filed Nov. 20, 1922    5 Sheets-Sheet 1

INVENTOR
William C. Baxter
By his Attorney
Nelson W. Howard

Feb. 19, 1929.　　　　　　　　　　　　　　　1,702,397
W. C. BAXTER
MACHINE FOR SHAPING UPPERS OVER LASTS
Original Filed Nov. 20, 1922　　5 Sheets-Sheet 2
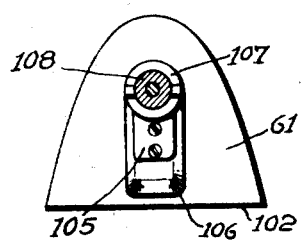
Fig. 3
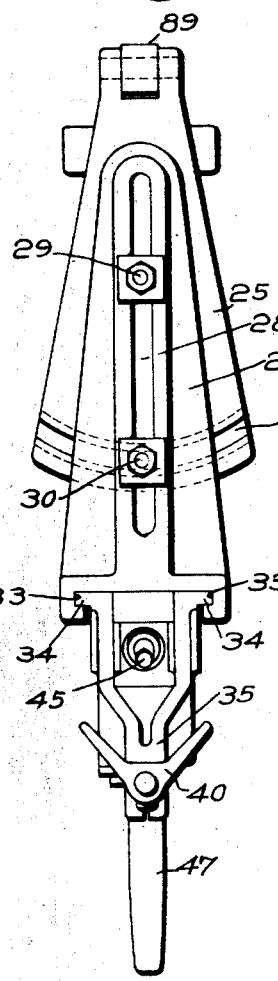
Fig. 2
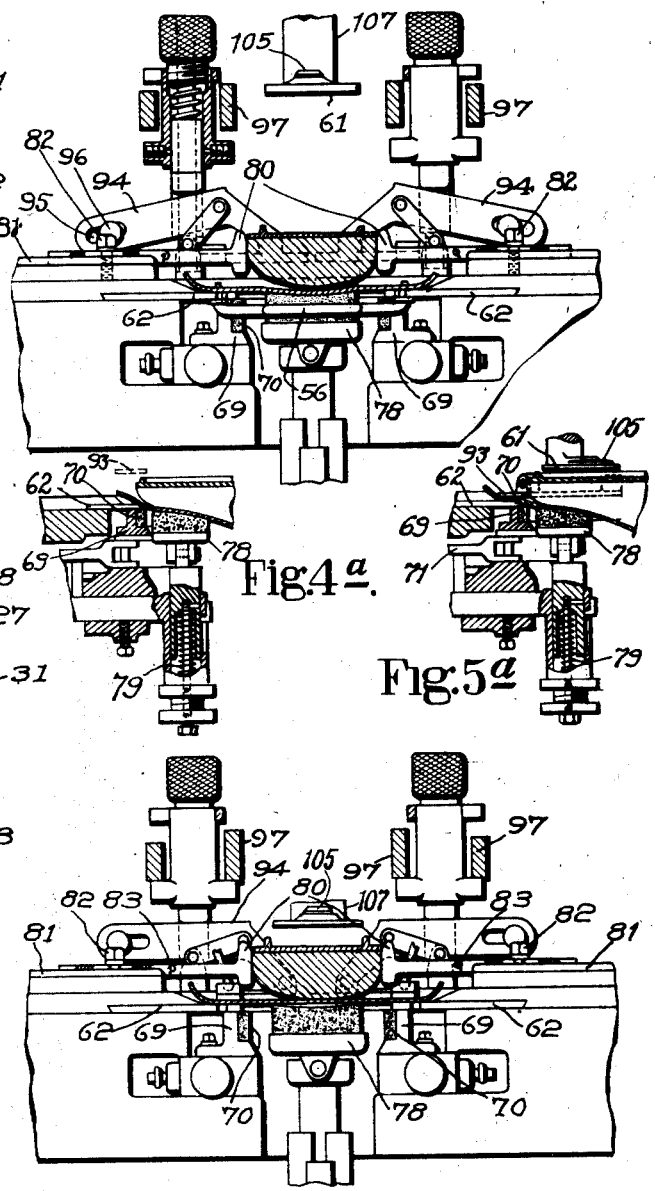
Fig. 4
Fig. 4ª
Fig. 5ª
Fig. 5
INVENTOR
William C. Baxter
By his Attorney,
Nelson W. Howard

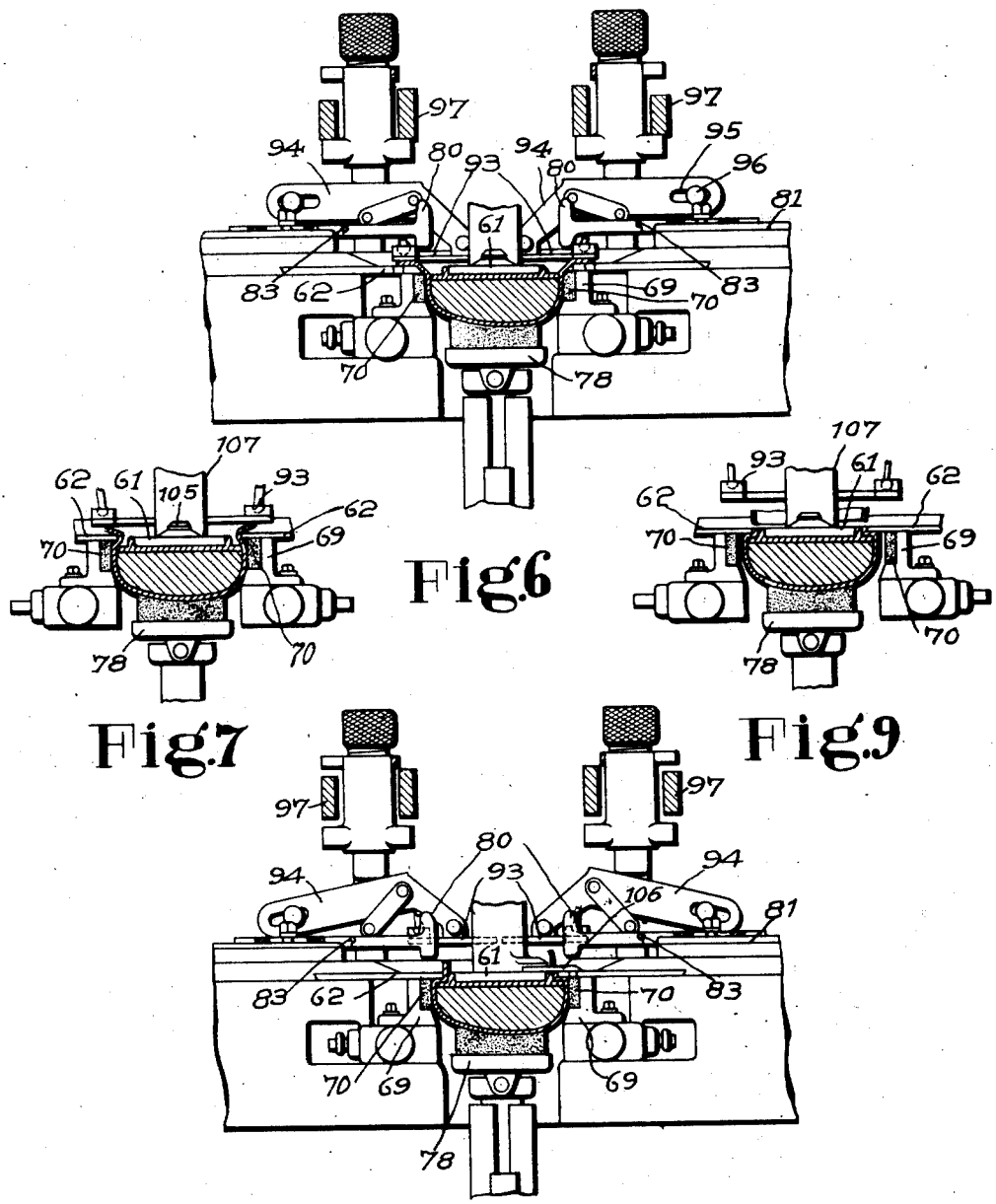

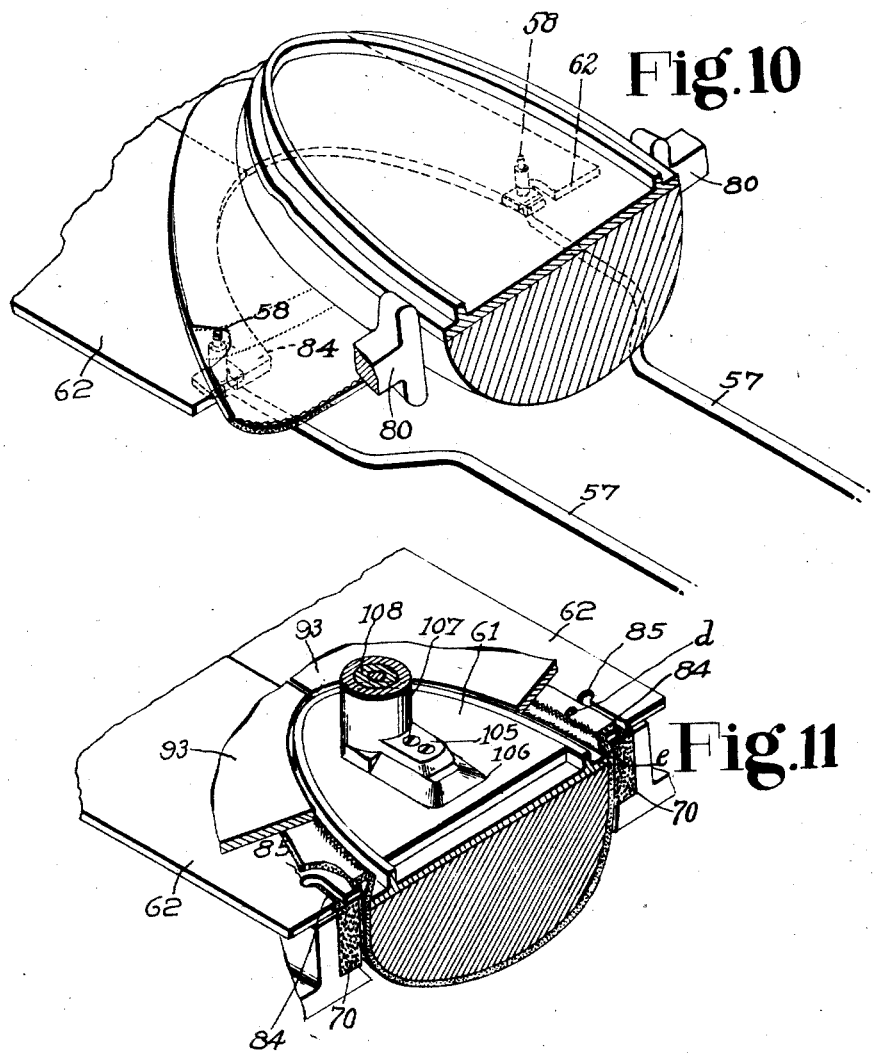

Feb. 19, 1929.  
W. C. BAXTER  
1,702,397  
MACHINE FOR SHAPING UPPERS OVER LASTS  
Original Filed Nov. 20, 1922    5 Sheets-Sheet 5

Patented Feb. 19, 1929.

1,702,397

UNITED STATES PATENT OFFICE.

WILLIAM C. BAXTER, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR SHAPING UPPERS OVER LASTS.

Application filed November 20, 1922, Serial No. 602,245. Renewed September 18, 1926.

This invention relates to machines for shaping uppers over lasts, and is herein illustrated in its application to a machine for lasting the toes of shoes.

Among its important objects, the invention aims to provide a machine by the use of which uppers will be shaped in conformity to their lasts in accordance with a predetermined standard, with resulting uniformity in the quality of the work, and whereby such uniformly excellent results will be secured without the need for any high degree of skill on the part of the workman. For the purposes in view, the invention provides a novel organization of upper shaping means and last and upper positioning means, the machine herein shown having means for positioning the last lengthwise, laterally and angularly as predetermined for the size and style of the shoe and means for jigging the upper to position it accurately for the upper shaping operation in accordance with a predetermined standard. The jigging of the upper may be effected, as herein illustrated, by the use of jig pins which engage the upper in jig holes formed in standardized locations at the opposite sides of its forepart and which enter slots in the toe-embracing wipers of the machine to position the upper relatively to the wipers and the last. By the use of such upper and last positioning means the operator is enabled to produce uniform results in operating upon all shoes of the same size and style without the exercise of any high degree of care or skill.

Features of the invention are also to be recognized in a novel organization of means for effecting relative movement of upper shaping means and a last to shape the upper over the last. Among such features, the invention provides novel means for pulling the upper lengthwise of the last, the machine shown having means for imparting to the last a predetermined lengthwise movement relatively to means which clamps the upper upon the wipers about the toe and also relatively to a toe rest engaging the upper on the top of the forepart to tension or stretch the upper lengthwise before it is shaped over the toe end of the last. The provision of means for pulling the upper by such movement of the last has a further important advantage in a machine having means for jigging the upper as hereinabove described, since it permits the last and the shoe materials to be positioned initially far enough forward to enable the operator to position the jig pins readily in the slots in the wipers.

To assist in positioning the work for the upper shaping operation the machine herein shown has means for engaging the opposite sides of the last to determine the lateral position of its forepart, and further features of the invention are to be recognized in a novel combination of last positioning means with cooperating parts of the organization of the machine. As herein illustrated, the last is positioned in the above-mentioned manner during its lengthwise movement relatively to the upper clamping means, and has thereafter imparted to it a heightwise movement relatively to the toe lasting means by the action of a presser member which engages the insole inside of the insole rib and serves to maintain the forepart of the last in the lateral relation to the lasting means previously determined by engagement with the sides of the last.

Still another feature of the invention consists in novel means for trimming the toe of the upper. For this purpose, the machine illustrated has a cutter associated with the insole engaging presser member and automatically operated in time relation to the shaping of the upper over the last and the insole to cut outwardly through the upstanding margin of the upper materials at one side of the toe and to trim the materials progressively round the toe to the other side by a cut parallel to the bottom face of the insole and above the insole rib.

The foregoing and other features of the invention, including certain novel details of construction and combinations of parts, will now be more particularly described by reference to the accompanying drawings and pointed out in the claims.

Figure 13:
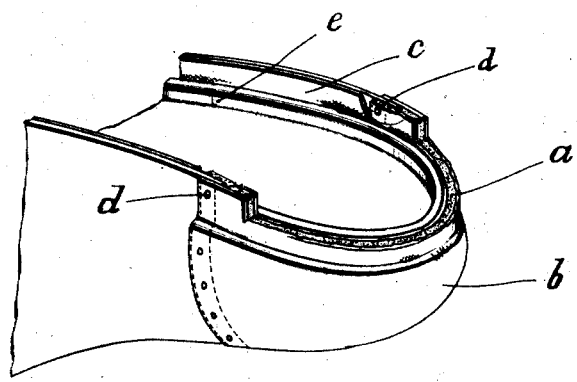
Figure 12:
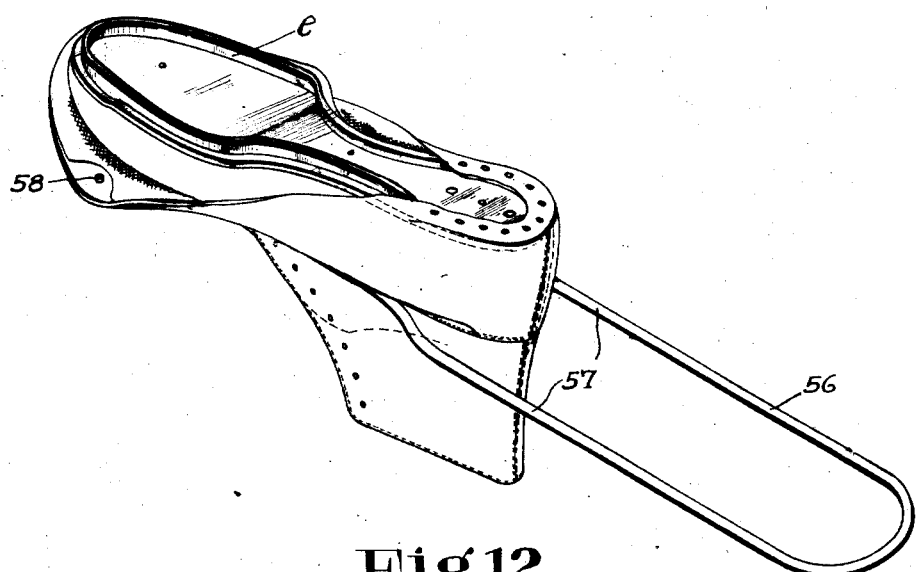

In the drawings,

Fig. 1 is a side elevation of a machine embodying the invention, with parts shown in vertical section, Fig. 2 is a plan view of the shoe support or jack, Fig. 3 is a plan view of the insole engaging presser member with its associated upper trimming cutter, Fig. 4 is a view in front elevation, with parts in section, illustrating the manner in which the forepart of the last and the upper are positioned for the operation of the machine, Figs. 5, 6, 7, 8 and 9 are views generally similar to Fig. 4 illustrating the positions of the parts at different times in the cycle of operations of the machine, Figs. 4ª and 5ª are views in vertical section illustrating the lengthwise position of the last relatively to the operating instrumentalities when the parts are positioned as shown respectively in Figs. 4 and 5, Figs. 10 and 11 are enlarged perspective views of the work and some of the operating instrumentalities when the parts are positioned as illustrated respectively in Figs. 4 and 7, Fig. 12 is a perspective view of the work in its relation to means which is utilized to jig the upper, and Fig. 13 is a perspective view of the toe end of the shoe as it appears after it has been operated upon by this machine.

It is contemplated that for the best results in the manufacture of the shoe the work will come to this machine with its heel end portion shaped to conform to the contour of the last and secured to the insole, and with the insole tacked to the bottom of the last, as herein shown. While the operations upon the heel end portion of the shoe may be performed by any well-known type of heel seat lasting machine or other machine suitable for the purpose, it is preferred to utilize the machine shown in my earlier application Serial No. 514,247 filed on Nov. 10, 1921. It is also contemplated that for the better accomplishment of some of the objects of the invention the toe end portion of the upper materials will preferably include a stiffener adapted to be rendered soft and pliable, for example by heat, and to harden quickly after the upper has been conformed to the contour of the last and the insole so that the materials will maintain their shape without extraneous fastening means when the lasting or shaping pressure is removed. As herein illustrated, a sheet of toe stiffening material $a$ is secured between the upper $b$ and the lining $c$, and it will be understood that before the work is presented to the machine the stiffener will be softened by subjecting it to the action of heat in any suitable well-known manner.

Conveniently the invention is herein illustrated in its application to a machine which includes in its general organization many of the structural features of an earlier machine devised for molding the toes of uppers off the last and shown and described in detail in Letters Patent No. 1,692,284, granted upon my application on November 20, 1928. In view of the prior disclosure, therefore, such features of the present machine as are common to the earlier construction will be referred to only in brief terms, and for a better understanding of the organization of the machine as a whole reference may be made to the above-mentioned Letters Patent.

The frame 1 of the machine supports a main driving shaft 2 which is operated continuously from any suitable source of power. The shaft 2 carries a spiral gear 3 which engages and drives a co-operating spiral gear 4 loosely mounted on a shaft 5. Fast on the gear 4 is a clutch member 6 arranged to co-operate with a clutch member 7 which is keyed to the shaft 5 and is movable longitudinally thereon. The clutch member 7 is under control of a hand lever 8 pivoted at 9 on the frame and having an extension 10 connected by a link 11 to a slide rod 12 which is connected to the clutch member 7. By this means the operator is enabled to disconnect the shaft 5 from the source of power and thereby stop the operation of the machine at any point in the cycle if he so desires.

Mounted on the shaft 5 is a worm 14 which engages and drives a gear wheel 15 rotatably mounted upon a shaft 16. Mounted also on the shaft 16 are a plurality of cam wheels 17, of which only one is shown in the drawings, these cam wheels being formed with suitable path cams for imparting the required movements to the different operating instrumentalities.

Preferably, as illustrated in the earlier patent, the machine will be of the twin type, having duplicate sets of mechanism for operating respectively upon right and left shoes. The different halves of the machine will preferably be controlled independently of each other, and to this end different sets of cam wheels 17 are each associated with a clutch, preferably of the Horton type, comprising a member 17' having different shoulders formed thereon for engagement with a clutch pawl 18 which is operated to trip the clutch by means of a treadle 19. One half of the machine may thus be used to operate upon a shoe while a shoe previously operated upon is held under upper shaping pressure in the other half of the machine to permit the upper materials to set in the acquired shape. It will be noted that the member 17' has two shoulders for engagement with the pawl 18, so that the operating mechanism will come to a stop to permit the upper to set, as illustrated in Fig. 1, and upon a subsequent depression of the treadle the various instrumentalities will be returned to their starting positions and the shoe will be released. The details of this operating and controlling mechanism are more fully shown and described in the prior patent and require no further description herein.

Since the various instrumentalities for controlling and for operating upon the work, together with their operating mechanisms, are duplicated in the opposite halves of the machine, it will be necessary for an understanding of the present invention to describe only such instrumentalities and mechanisms as are provided for operating upon a shoe at one side of the machine. The frame 1 has at its top a table 20 which serves to support a number of the operating instrumentalities. Below this table is a shaft 21 which supports a hanger 22 to which are pivoted at 23 a plurality of parallel arms or links 24 pivotally connected in turn at 26 to a plate 25 which is thus supported by the links. Mounted on the plate 25 is a plate 27 provided with a slot 28 arranged to extend lengthwise of the shoe, and through this slot extend bolts 29 and 30 which serve to clamp the plate 27 to the underlying plate 25. The plate 25 is provided with a curved slot or guideway 31 for the headed end of the bolt 30. It will be evident that by means of this construction the plate 27 and the last supported thereon by means hereinafter described may be adjusted both lengthwise and angularly in such manner as to position the last of any size and style of shoe in the correct lengthwise and angular relation to the operating instrumentalities.

On its outer end the plate 27 has a downwardly extending arm 32 provided with guideways 33 for flanges 34 of an upright jack arm 35. Extending downwardly from the arm 35 is a stem 36 which passes through a lug 37 on the arm 32, and surrounding this stem is a spring 38 which serves to maintain the arm 35 initially in upraised position. On its lower end the stem 36 is provided with nuts 39 which serve by engagement with the lug 37 to determine the upward limit of movement of the arm 35.

Mounted on the arm 35 is a shoe end embracing heel rest 40 which has a depending stem 41 adjustably clamped in the upper end of the arm 35 by means of a clamping screw 42. Pivotally mounted on the arm 35 at 43 is a jack post 44 on the upper end of which a last pin 45 is pivoted for swinging movement lengthwise of the shoe. Fast with the post 44 is a lever arm 47 which carries a pawl 48 arranged to engage teeth 49 on the arm 35 to hold the jack post from forward movement. It will be understood that in presenting the work to the machine, assuming that the plate 27 has been adjusted in accordance with the size and style of the shoe, the last with the shoe materials thereon is mounted upon the last pin 45 with the forepart of the shoe resting upon a toe rest hereinafter described, and the shoe is then moved rearwardly to seat its heel end against the heel rest 40 by rearward swinging movement of the jack post 44, and when the work has been thus properly positioned the jack post is held from return forward movement by the pawl 48.

For the purpose of uniformity in the shaping of different uppers there is provided means for jigging the upper to position it in exact predetermined relation to the operating instrumentalities. As herein shown, such jigging of the upper is effected by engaging it in jig holes located invariably in the same position in all uppers of the same size and style, for example near the ends of the tip seam as shown at $d$ in Fig. 13 and as more fully explained in the prior patent hereinbefore mentioned. Various means may be utilized for engaging the upper in its jig holes and for positioning it thereby in predetermined relation to the operating instrumentalities, the drawings illustrating for this purpose the use of a jigging tool or presenter similar to the disclosure of the prior patent. The presenter comprises a handle portion 56 from which opposite side portions 57 extend forwardly for engagement with the upper at opposite sides of the shoe and terminate in outwardly extending portions provided with upturned ends 58, which may be appropriately termed jig pins, adapted to enter the jig holes in the upper and to co-operate with the wipers as hereinafter explained to jig the upper.

Pivotally mounted at 59 on the table 20 is a presser carrier or arm 60 upon the front end portion of which is supported a presser plate or hold-down member 61 adapted to engage the insole and to effect depression of the shoe prior to the operation of the wipers. For welt shoe work, as illustrated, the member 61 will preferably have an edge contour similar to the contour of the toe end portion of the lip or rib $e$ of the insole and will be shaped to fit substantially inside of the rib and thereby to provide an abutment to assist in supporting the rib against the thrust of the wipers in their overwiping movement. It will be understood that the wipers 62 are advanced and closed to effect the overwiping of the upper by mechanism substantially like that shown and described in the prior patent, comprising a link 63 and a toggle 64 connected at 65 to an operating rod 66, the latter being connected at its lower end to a lever 67 provided with a roll 68 controlled by one of the operating cams.

In the depression of the shoe by the downward movement of the member 61 the upper is wiped upwardly about the toe by a toe embracing band constructed and controlled substantially like the mold embracing band of the prior patent. This band comprises a support 69 faced by a pad 70 and is opened and closed at appropriate times in the operation of the machine by an operating member 71 connected to one arm of a bell crank 72 which is operated by one of the cams of the machine through a rod 73 and a lever 74. When the shoe is depressed the band is in its closed position to adapt it to embrace the upper closely about the toe of the last and to wipe the upper upwardly to the edge of the insole. The operation of the arm 60 to effect the depression of the shoe is accomplished through an operating rod 75 connected to a lever 76 which is provided with a roll 77 controlled by one of the cams. It is preferable that after the wipers have wiped the upper inwardly over the feather of the insole additional pressure be applied perpendicularly to the plane of the insole, and accordingly the cam which operates the lever 76 is suitably formed to impart at the appropriate time a slight reverse movement to the rod 75, thereby raising the member 61 slightly and permitting the shoe to be forced upwardly against the wipers with greater pressure. To assist in positioning and supporting the forepart of the shoe as the shoe is depressed by the member 61, and also to assist in conforming the upper to the contour of the top of the forepart of the last, the machine is provided with a toe rest 78 yieldingly supported by a spring 79. It will be understood that the shoe is depressed in the manner described, against the resistance of the spring 79 and of the light spring 38 in the jack, and that when the pressure of the plate 61 on the insole is relaxed these springs react to press the shoe upward more firmly against the wipers.

Further to assist in insuring uniformity in the operation of the machine on different shoes there are provided gage members 80 which are arranged to engage the opposite sides of the forepart of the last and to center the last between them. These gages are supported on a cover plate 81 over the wipers, and have slots through which clamping screws 82 extend to permit the gages to be adjusted initially in accordance with the size and style of the shoe, the clamping screws then holding the gages in adjusted position. The gages 80 are provided with joints 83 which permit their last engaging ends to yield upwardly if engaged by the work in the return of the latter to starting position. It will be understood that after the jack has been adjusted to position the work approximately as required by the size and style of last, the gages 80 are adjusted with reference to the toe band and the presser plate 61, so that this plate as it descends will be seated properly between the opposite side portions of the insole rib and so that the last will be properly centralized relatively to the toe band. Such accurate positioning of the last, in co-operation with the jigging of the upper as hereinbefore explained, insures uniformity in the results produced by the operation of the machine on different shoes.

To co-operate with the pins 58 to effect the jigging of the upper, the wipers 62 are provided with slots 84 which terminate in laterally offset locking portions 85. When the presenter, with its pins engaging the upper in the jig holes, is moved forwardly to present the upper over the top of the wipers, the pins are moved into the slots 84 until they seat themselves in the offset portions 85, (Figs. 4 and 10) whereby the position of the toe end of the upper relatively to the wipers and to the other operating instrumentalities, and the resulting length of tip and the angularity of the tip seam, are predetermined. The upper is thus jigged when the work is presented to the machine and it may be, if desired, before the last has been seated rearwardly against the heel rest 40.

To assist in pulling or stretching the upper lengthwise of the last, as well as to facilitate the jigging of the upper by the movement of the pins 58 forwardly into the slots in the wipers, the last is so positioned initially (Fig. 4ᵃ) that its toe end projects forwardly over the toe band. In the operation of the machine movement of automatically determined extent is imparted to the jack to carry the last and the heel end portion of the upper rearwardly before the last is depressed into the toe band, the margin of the upper about the toe being clamped on the wipers at the time of such rearward movement of the last as hereinafter more fully explained. To effect such rearward movement of the jack the operating member 75 whereby the downward movement of the presser plate 61 is effected is provided with a cam 86 having a hub portion 87 secured adjustably to the member 75 by a set screw 88. The cam 86 engages a roll 89 which is mounted on the plate 25. The roll 89 is held in engagement with the cam by means of a spring 90 connected at 91 to one of the links 24 and at 92 to the hanger 22. The spring thus acts to force the jack forwardly or inwardly as far as permitted by the cam and yields in the downward movement of the cam whereby the rearward movement of the jack is effected. It will be understood that such rearward movement of the jack takes place as the presser plate 61 is moving downwardly toward the insole and is completed (Figs. 5 and 5ᵃ) by the time this plate arrives in position to engage the insole. Such movement of the work also serves to position the rib of the insole correctly in relation to the front edge of the presser plate. It will be evident that as the last is moved rearwardly in this manner the toe rest by its friction on the upper assists the clamping means in pulling the upper lengthwise of the last.

The means for clamping the margin of the upper upon the top face of the wipers comprises clamp members 93 which are moved downwardly to clamping position immediately upon the starting of the machine. The members 93 are mounted upon arms 94 connected by slots 95 with pins 96 which are mounted on the wiper carriers. The arms 94 are under control of operating arms 97 pivotally supported at 98 on the cover plate 81, the arms 97 being operated through a rod 99 and a lever 100 from one of the operating cams, as more fully described in the prior patent. When the clamping members are moved to clamping position they engage the upper ends of the jig pins 58 and assist in moving these pins downwardly to free them from engagement with the upper, the operator then withdrawing the presenter as the machine continues its operation.

Since the presser plate 61, positioned to abut against the inner side of the rib of the insole as hereinbefore explained, supports the rib against the rearward thrust of the wipers, it is advisable that it be rigidly supported against the pressure of the wipers without undue strains upon its controlling mechanism. In the construction shown the presser plate is additionally supported by a brace 101 which is pivoted on the front end of the arm 60 and is arranged to bear against the rear edge 102, Fig. 3, of the presser plate. For positioning the brace in proper relation to the presser plate there is provided an adjusting screw 103 which is threaded in an upward extension of the brace member and bears against the arm 60.

The machine is further provided with means for trimming the margin of the upper about the toe after the margin has been gathered and wiped inwardly to produce an upstanding flange against the rib of the insole. The trimming means, which in many respects is similar to that disclosed in the earlier patent, comprises an arm 105 with a trimming cutter or blade 106 secured thereto for movement along the top face of the presser plate 61, the arm 105 having a hub portion 107 which is rotatably mounted on the stem 108 which carries the presser plate and is supported at its lower end on the presser plate. The hub 107 is detachably connected to a pinion 109 on the stem 108 driven by a pinion 110 which is operated by a rack bar 111. Movements are imparted to the rack bar 111 from one of the operating cams through connections including a link 112, a lever 113, a bell crank 114 connected by a link to the lever 113, and a rod 115 connecting the bell crank to a cam-operated lever 116. Through these connections operative turning movement is imparted to the trimmer while the margin of the upper is held in over-wiped position by the wipers, the trimmer being positioned and guided by the presser plate 61 to trim the upstanding margin of the upper above the rib of the insole and above the top faces of the wipers. In the construction shown the trimmer 106 is arranged to cut outwardly through the upper at one side of the toe and to trim the upper progressively round the toe to the other side, making a slit through the upper materials extending from a point in front of the tip seam at one side to a point in front of the tip seam at the other side of the toe, the surplus material being left attached to the upper until after the shoe is removed from the machine so as to avoid clogging the machine by the waste material. After the shoe is removed the narrow strip of waste material may be severed from the upper at each side of the toe, for example by the use of a hand knife. To terminate the trimming of the upper thus in front of the tip seam at each side of the toe, as illustrated in Fig. 13, it is sometimes useful as an aid in the side lasting operation as more fully explained in the earlier patent, although it is within the province of the invention to trim the upper farther rearwardly, if desired.

In the use of the machine, the last, with the shoe materials prepared, for example, as hereinbefore explained, is mounted upon the jack with the pin 45 engaging the last in its spindle hole, and the last is then moved backwardly by the lever 47 to seat the rear end of the shoe against the heel rest 40, in which position the work is held by the pawl 48. By reason of the pivotal connection of the pin 45 with the post 44, this backward movement of the last causes the last to tip about the axis of the pin in response to the engagement of the heel rest 40 with the shoe, so that the toe end of the shoe is pressed down on the toe rest 78. Preferably before the last is mounted upon the jack, or it may be after it is thus mounted, the pins 58 of the presenter are inserted in the jig holes previously formed in the upper, and in presenting the work the pins 58 are moved forwardly into the slots 84 of the wipers to position the toe portion of the upper with its margin outspread over the top of the wipers, the pins 58 entering the offset portions 85 of the slots to insure their correct relation to the wipers. The toe portion of the upper is thus positioned in a relation to the wipers which is invariable for all shoes of the same size and style. The toe portion of the last, moreover, is accurately centralized between the gages 80, as predetermined for the style and size of the shoe by previous adjustment of these gages, and the lengthwise and angular relation of the last to the wipers and to the jigged upper are further determined by the jack. It will be evident that both the last and upper are thus positioned in standardized relation to each other and to the instrumentalities which are to operate upon the shoe.

The work having been thus positioned, the appropriate half of the machine is started by depression of its treadle 19. Immediately upon the starting of the operating means the clamp members 93 are moved into position to clamp the margin of the upper upon the top face of the wipers, and as these members are moved to clamping position the presenter is withdrawn. In the meantime the arm 60 begins its downward movement, and as soon as the upper is clamped by the members 93 the cam 86 becomes effective to impart rearward movement to the jack and the last, thereby subjecting the upper to a lengthwise pull between the last and the clamping means, assisted by the frictional engagement of the toe rest 78 with the upper, and finally positioning the toe end of the last in proper relation to the underlying toe band as illustrated in Fig. 5ª. As soon as the rearward movement of the last is completed the presser plate 61 seats itself upon the insole in close relation to the insole rib, and by continued movement of the arm 60 the last and the jack are depressed, forcing the toe rest 78 downwardly, and through the action of the toe band effecting the upwiping of the upper about the toe to the edge of the insole. As the last is forced downwardly below the gages 80, it is maintained in the lateral position determined by these gages through the action of the member 61 in engagement with the bottom face and the rib of the insole. In this downward movement of the last the clamp members 93 maintain their pressure upon the margin of the upper while permitting it to slip more or less in response to the pull of the last. As soon as the last arrives at its lower limit of movement (Fig. 6) the wipers are advanced and closed to wipe the margin of the upper inwardly over the feather of the insole (Fig. 7), the clamp members relaxing their pressure upon the upper as the wipers begin to close. After the wipers have completed their inward movement the presser plate 61 is moved upward slightly to cause the shoe to be forced up against the wipers with increased pressure, and thereafter the toe trimming cutter is operated (Fig. 8) to trim the margin of the upper, as hereinbefore explained, and is returned to its starting position. Since the upper is to remain for a substantial time under the shaping pressure of the wipers, it is desirable, in order to avoid any danger of marking the shoe by the pressure of the toe band, to relax this pressure, and for this purpose the band is opened by its controlling mechanism, as illustrated in Fig. 9. The operating means then comes to a stop to permit the upper materials to set or harden in the shape imparted to them. The operator may then present a shoe to the other half of the machine and start that half in operation. Subsequently that portion of the machine which operated upon the first shoe is again started by depression of its treadle, whereupon the parts are returned to starting position and the shoe is released. In the upward movement of the shoe the side gages 80 may yield upwardly if engaged by the shoe. The operator then removes the shoe and may detach the waste material from the toe by the use of a hand knife or by other suitable means. The toe of the shoe then has the appearance illustrated in Fig. 13, with the upper held in lasted position by its stiffening material without the need for any extraneous fastening means. Thereafter the side lasting of the shoe may be performed, followed by the sewing on of the welt.

While the invention is herein illustrated in its application to the manufacture of welt shoes, it is to be understood that in many of its aspects the invention is not limited to that class of work but may be utilized with advantage in the manufacture of other kinds of shoes.

Having described the invention, what I claim as new and desire to secure by Letters Patent of the United States is:—

1. In a machine for shaping uppers over lasts, the combination with upper shaping means, of means for jigging an upper to position it relatively to said upper shaping means, and means for positioning a last in a relation to the upper shaping means predetermined for the size and style of the shoe.

2. In a machine for shaping uppers over lasts, the combination with upper shaping means, of means for jigging an upper to position it relatively to said upper shaping means, and means for positioning a last lengthwise, laterally and angularly in predetermined relation to the jigged upper.

3. In a machine for shaping uppers over lasts, the combination with upper shaping means, of last positioning means adjustable for different sizes and styles of shoes and constructed to position the lasts of all shoes of the same size and style in the same relation to the upper shaping means, and means for jigging the uppers of the different shoes to position them for the upper shaping operation.

4. In a machine for shaping uppers over lasts, the combination with upper shaping means, of means for engaging an upper in jig holes formed therein to position the upper relatively to the upper shaping means in accordance with a predetermined standard, and last positioning means constructed to position the last in a relation to the upper shaping means predetermined for the size and style of the shoe.

5. In a machine for shaping uppers over lasts, the combination with upper shaping means, of last positioning means adjustable for different sizes and styles of shoes, and means for jigging an upper to position it relatively to the last for the upper shaping operation.

6. In a machine for shaping uppers over lasts, the combination with means for working an upper over a last and into lasted relation to an insole on the bottom of the last, of means for positioning the last and the upper in standardized relation to each other for the upper shaping operation comprising a device for engaging the upper in jig holes formed therein to position the upper relatively to the last.

7. In a machine for shaping the toes of uppers over lasts, the combination with upper shaping means, of means for engaging an upper in jig holes formed in opposite sides of its forepart to position the toe of the upper in relation to the upper shaping means, and means for positioning a last for the upper shaping operation in a lengthwise, lateral and angular relation to the upper shaping means predetermined for the size and style of the shoe.

8. In a machine for shaping the toes of uppers over lasts, the combination with upper shaping means, of means for jigging the toes of uppers to insure for all uppers of the same size and style an invariable relation to said upper shaping means, and last positioning means constructed to position the lasts of all shoes of the same size and style in the same lengthwise, lateral and angular relation to the toes of the uppers thus jigged.

9. In a machine for lasting the toes of shoes, the combination with toe lasting means, of means for positioning for the lasting operation a last with an upper and an insole mounted thereon, and means for engaging positioning surfaces formed on the forepart of the upper in standardized relation to the upper to determine the lengthwise, lateral and angular relation of the toe of the upper to the last.

10. In a machine for lasting the toes of shoes, the combination with toe lasting means, of means for positioning relatively to said toe lasting means a last having an upper and an insole mounted thereon, said positioning means being constructed to position the last in a relation to the lasting means predetermined for the size and style of the shoe, and means for engaging the upper in jig holes formed therein to position the toe of the upper relatively to the last.

11. In a toe lasting machine, the combination with last positioning means and means for working an upper over the toe of the last and into lasted relation to an insole on the bottom of the last, of means for jigging the toe of the upper to position it relatively to the last for the lasting operation.

12. In a toe lasting machine, the combination with last positioning means and means for working an upper over the toe of the last and into lasted relation to an insole on the bottom of the last, of means for engaging the upper in jig holes formed in opposite sides of its forepart to determine the lengthwise, lateral and angular relation of the toe of the upper to the last.

13. In a machine for shaping the toes of uppers over lasts, the combination with upper shaping means, of last positioning means comprising a support for the last and mechanism for determining the lateral position of the forepart of the last, and means for jigging the upper to position its toe end portion relatively to the forepart of the last for the upper shaping operation.

14. In a machine for shaping the toes of uppers over lasts, the combination with upper shaping means, of means for engaging an upper in jig holes formed therein to position the toe end of the upper relatively to the upper shaping means, and last positioning means comprising a support for the rear end portion of the last and members for engaging the opposite sides of the forepart of the last to position the toe end of the last relatively to the jigged upper.

15. In a machine for shaping the toes of uppers over lasts, the combination with upper shaping means, of means for engaging an upper in jig holes formed in opposite sides of its forepart to position its toe end portion lengthwise, laterally and angularly in relation to the upper shaping means, a jack having a device for embracing the rear end of the last and constructed to position the last lengthwise and angularly in relation to the upper shaping means, and members for engaging the opposite sides of the forepart of the last to position the toe end of the last laterally in relation to the upper shaping means.

16. In a machine for shaping the toes of uppers over lasts, the combination with upper shaping means, of means for jigging an upper to position its toe end portion relatively to the upper shaping means, a jack adjustable for different sizes and styles of shoes and constructed to position the last lengthwise and angularly in relation to the upper shaping means, and additional means for determining the lateral position of the forepart of the last.

17. In a machine for shaping the toes of uppers over lasts, the combination with upper shaping means, of means for jigging an upper to position its toe end portion relatively to the upper shaping means, means for positioning the last relatively to the jigged upper comprising mechanism for determining the lateral position of the forepart of the last, and additional means for maintaining the forepart of the last during the upper shaping operation in the lateral relation to the upper shaping means thus determined.

18. In a machine for shaping the toes of uppers over lasts, the combination with upper shaping means, of means for jigging an upper to position its toe end portion relatively to the upper shaping means, last positioning means comprising members for engaging the opposite sides of the last to determine the lateral position of its forepart, and means for imparting to the last a movement relatively to said members in the upper shaping operation comprising a device constructed to maintain the forepart of the last in the lateral relation to the upper shaping means determined by said members.

19. In a toe lasting machine, the combination with lasting means for shaping the toe of an upper over a last and in the angle between the feather and the rib of an insole on the bottom of the last, of means for jigging the upper to position its toe end portion relatively to said lasting means, means for positioning the last relatively to the jigged upper comprising mechanism for determining the lateral position of the forepart of the last, and means for engaging the rib of the insole to maintain the forepart of the last in the lateral relation to the lasting means thus determined.

20. In a toe lasting machine, the combination with lasting means for shaping the toe of an upper over a last and in the angle between the feather and the rib of an insole on the bottom of the last, of means for jigging the upper to position its toe end portion relatively to said lasting means, last positioning means comprising members for engaging the opposite sides of the last to determine the lateral position of its forepart relatively to the jigged upper, and mechanism for effecting by engagement with the insole a heightwise movement of the last relatively to said positioning members and the lasting means, said mechanism being constructed for engagement with the rib of the insole at opposite sides of the forepart to maintain the last in the lateral relation to the lasting means determined by said members.

21. In a machine for shaping the toes of uppers over lasts, the combination with upper shaping means, of last positioning means constructed to position a last initially out of the field of action of said upper shaping means, means for engaging the upper in jig holes formed therein to position the forepart of the upper relatively to the upper shaping means and the last, and means for effecting relative movement of the upper shaping means and the last to shape the toe of the upper over the last.

22. In a machine for shaping the toes of uppers over lasts, the combination with upper shaping means, of last positioning means comprising a jack for supporting a last in predetermined relation to said upper shaping means, means for jigging the upper to position its forepart relatively to the upper shaping means, and means for effecting relative movement of said upper shaping means and the jack to shape the toe of the upper over the last.

23. In a machine for shaping the toes of uppers over lasts, the combination with upper shaping means comprising toe embracing wipers, of last positioning means comprising a jack constructed to position a last initially with the bottom of its forepart out of the plane of the wipers, means for engaging the upper in jig holes formed therein to position its marginal portion outspread over the wipers and relatively to the toe of the last, and means for applying pressure to the forepart of the last to move it heightwise relatively to the wipers in the upper shaping operation.

24. In a toe lasting machine, the combination with toe lasting means, of means for positioning in predetermined relation to said lasting means a last having an upper and an insole thereon, means for jigging the upper to position its forepart relatively to the lasting means, and means for applying pressure to the insole to move the last relatively to the lasting means in the lasting operation.

25. In a toe lasting machine, the combination with toe lasting means, of last positioning means comprising a support for a last with its upper and insole constructed to position the last initially with its forepart upraised in relation to the lasting means, means for engaging the upper in jig holes formed therein to position its toe end portion relatively to the lasting means, and means for imparting to the last a heightwise movement relatively to the lasting means comprising a presser arranged to engage the insole on the forepart of the last.

26. In a machine for shaping the toes of uppers over lasts, the combination with upper shaping means, of means for jigging the upper to position it in predetermined relation to said upper shaping means, and means for effecting relative movement of said upper shaping means and the last to shape the upper comprising mechanism for effecting a relative movement of said upper-shaping means and the last lengthwise of the last to pull the upper.

27. In a toe lasting machine, the combination with toe lasting means comprising toe embracing wipers and means for clamping an upper on said wipers, of means for jigging the upper to position its toe end in relation to said wipers and clamping means, means for positioning a last in predetermined relation to the jigged upper, and means for effecting a relative movement of automatically determined extent between said wipers and clamping means and the last to pull the upper lengthwise of the last.

28. In a toe lasting machine, the combination with toe lasting means comprising toe embracing wipers and means for clamping an upper on said wipers, of means for jigging the upper in relation to said wipers comprising members for engaging the upper in jig holes formed therein and adapted to enter slots in the wipers to determine the position of the toe of the upper, means for supporting a last in such relation to said lasting means as to facilitate positioning said members in the slots in the wipers, and means for imparting to the last thereafter a lengthwise rearward movement relatively to said wipers and clamping means to pull the upper lengthwise of the last.

29. In a toe lasting machine, the combination with toe lasting means comprising a toe band, toe embracing wipers and means for clamping an upper on said wipers, of means for engaging the upper in jig holes formed therein at opposite sides of its forepart to position the upper relatively to the wipers, means for supporting a last with its toe end upraised in a forward position relatively to the lasting means, and means for imparting to the last in the lasting operation a lengthwise rearward movement relatively to the wipers and the clamping means to pull the upper and a heightwise movement to upwipe the upper by the action of the toe band.

30. In a toe lasting machine, the combination with toe lasting means, of means for jigging an upper to position its toe end relatively to said lasting means, a presser and means for operating it in engagement with an insole on the bottom of the last to impart a heightwise movement to the last in the lasting operation, and a toe rest arranged to apply a yielding pressure to the upper on the top of the forepart in such movement of the last to assist in maintaining the upper in the relation to the last determined by the jigging means.

31. In a machine of the class described, the combination with means for shaping an upper over the toe of a last, of last positioning means constructed for engagement with the opposite sides of the last to determine the lateral position of the toe end of the last, and means for imparting to the last after it has been thus positioned a heightwise movement relatively to the upper shaping means to shape the upper over the toe of the last.

32. In a machine of the class described, the combination with means for shaping an upper over the toe of a last, of last positioning means constructed for engagement with the opposite sides of the forepart of the last to determine the lateral position of the toe end of the last, and means for imparting to the last a heightwise movement relatively to said positioning means and the upper shaping means to shape the upper, said last-moving means being constructed to maintain the last in the lateral relation to the upper shaping means thus determined.

33. In a machine of the class described, the combination with means for shaping an upper over the toe of a last and over an insole on the bottom of the last, of work positioning means comprising members for engaging the opposite sides of the last to determine the lateral position of the toe end of the last when the work is presented to the machine, and a device arranged to engage the rib of the insole of the shoe at opposite sides of the insole to maintain the last during the upper shaping operation in the lateral relation to the upper shaping means determined by said members.

34. In a machine of the class described, the combination with means for shaping an upper over the toe of a last and over an insole on the bottom of the last, of work positioning means comprising members for engaging the opposite sides of the last to determine the lateral position of the toe end of the last, and means for imparting to the last a heightwise movement relatively to the upper shaping means comprising a device movable into engagement with the insole while the last is positoned by said members and constructed to maintain the last in the lateral relation to the upper shaping means thus determined.

35. In a machine of the class described, the combination with toe lasting means comprising toe embracing wipers and a toe band, of last and shoe positioning means constructed for engagement with the opposite sides of the forepart of the last to determine the lateral position of the toe end of the last, and means for effecting relative movement of the last and the toe lasting means to cause the toe band to wipe the upper heightwise of the toe while the toe end of the last is maintained in the lateral relation to the lasting means thus determined.

36. In a machine of the class described, the combination with toe lasting means constructed to embrace the upper about the toe of a last and to work the upper into lasted position, of means for positioning a last with its upper and insole in predetermined relation to said toe lasting means comprising means for engaging the last at the opposte sides of the forepart to determine the lateral position of the toe end of the last.

37. In a machine of the class described, the combination with means for shaping an upper over the toe of a last, of last and shoe positioning means comprising members relatively adjustable for different sizes and styles of shoes and arranged for engagement with the opposite sides of the forepart of the last to position the lasts of all shoes of the same size and style in the same lateral relation to the upper shaping means.

38. In a machine of the class described, the combination with means for shaping an upper over the toe of a last, of work positioning means comprising a support for the rear end portion of the last adjustable to determine substantially the angular relation of the last to the upper shaping means and relatively adjustable members arranged to engage the opposite sides of the forepart of the last to determine the lateral position of the toe end of the last.

39. In a machine of the class described, the combination with means for shaping an upper over the toe of a last, of work positioning means comprising a jack having a pin to enter the spindle hole of the last and means for engaging the opposite sides of the forepart of the last to determine the lateral position of the toe end of the last.

40. In a machine of the class described, the combination with means for shaping an upper over the toe of a last, of a jack for supporting the rear end of the last, means mounted independently of said jack for engaging the opposite sides of the forepart of the last to determine the lateral position of the toe end of the last, and means for imparting to the last and the jack a movement heightwise of the last and relatively to said last engaging means in the upper shaping operation.

41. In a machine of the class described, the combination with means for shaping an upper over the toe of a last, of last and shoe positioning means comprising members arranged to engage the opposite sides of the forepart of the last to determine the lateral position of the toe end of the last, a presser member shaped to fit substantially inside of the rib of the insole at the toe end of the last, and means for moving said presser member into engagement with the insole while the last is positioned by said last engaging members and for imparting to the last a heightwise movement relatively to the upper shaping means by further movement of said presser member.

42. In a machine of the class described, wipers for embracing an upper about the toe of a last, means for clamping the upper upon said wipers, and operating means for effecting relative movement of the last and said clamping means and wipers lengthwise of the last to pull the upper and for thereafter operating the wipers to wipe the upper inwardly over the bottom of the last.

43. In a machine of the class described, means for clamping an upper about the toe end of a last, and means for imparting to the last while the upper is held by said clamping means a bodily rearward movement of automatically determined extent to tension the upper lengthwise of the last.

44. In a machine of the class described, wipers for embracing an upper about the toe of a last and for wiping it inwardly over the bottom of the last, means for clamping the upper upon said wipers, and operating mechanism for imparting to the last a rearward movement relatively to the wipers and clamping means to pull the upper.

45. In a machine of the class described, means for clamping an upper at the toe end of a last, a jack for supporting a last with its upper in operative relation to said clamping means, and mechanism for imparting to the last through said jack a rearward movement relatively to the clamping means to pull the upper lengthwise of the last.

46. In a machine of the class described, toe lasting means comprising devices for clamping an upper about the toe of a last and for wiping the upper heightwise of the toe, and means for imparting to the last a rearward movement relatively to the toe lasting means to pull the clamped upper and for thereafter effecting relative movement of said lasting means and the last to wipe the upper heightwise of the toe.

47. In a machine of the class described, toe lasting means comprising devices for clamping an upper about the toe of a last and for wiping the upper heightwise of the toe, and operating mechanism for effecting automatically in time relation to each other a relative movement of the toe lasting means and the last lengthwise of the last to pull the upper and a relative movement heightwise of the last to upwipe the upper.

48. In a machine of the class described, toe lasting means comprising wipers for embracing an upper about the toe of a last and means for clamping the upper on said wipers, and means for effecting relative movement of said toe lasting means and the last lengthwise of the last to pull the clamped upper and for effecting thereafter relative movement of said lasting means and the last to wipe the upper heightwise of the toe.

49. In a machine of the class described, wipers for embracing an upper about the toe of a last, means for clamping the upper upon said wipers, and operating mechanism for imparting to the last a rearward movement relatively to said wipers and clamping means to pull the upper and a movement heightwise of the last to position the last in proper relation to the wipers for wiping the upper inwardly over the bottom of the last.

50. In a machine of the class described, means for clamping an upper about the toe of a last, a toe band, and means for imparting to the last a rearward movement relatively to said clamping means to pull the upper and thereafter a heightwise movement to force the toe of the shoe into said toe band.

51. In a machine of the class described, wipers for embracing an upper about the toe of a last, means for clamping the upper on said wipers, a toe band, means for positioning a last initially with its toe end projecting forwardly beyond the toe band, and means for imparting to the last in time relation to each other a rearward movement of predetermined extent to pull the clamped upper lengthwise of the last and a heightwise movement to force the toe of the shoe into said toe band.

52. In a machine of the class described, toe lasting means comprising devices for clamping an upper about the toe of a last and for wiping the upper heightwise of the toe, a presser for engaging an insole on the bottom of the last, and means for imparting to the last a rearward movement relatively to said presser to pull the clamped upper lengthwise of the last and for thereafter imparting to the last through said presser a heightwise movement for upwiping the upper about the toe.

53. In a machine of the class described, toe lasting means, a presser for engaging an insole on the bottom of a last and for imparting to the last a heightwise movement relatively to said toe lasting means, and mechanism automatically operative in time relation to said presser to impart to the last a predetermined rearward movement relatively to the presser prior to the heightwise movement of the last.

54. In a machine of the class described, toe lasting means, a jack for supporting a last with its upper and insole in operative relation to said toe lasting means, a presser for engaging the insole, means for operating said presser to carry it into engagement with the insole and thereafter to impart to the last a heightwise movement relatively to the lasting means, and mechanism automatically operative in time relation to said presser to impart to the jack a movement to carry the last rearwardly prior to the heightwise movement of the last.

55. In a machine of the class described, toe lasting means comprising wipers for embracing an upper about the toe of a last and means for clamping the upper on said wipers, a presser for engaging an insole on the bottom of the last, and means for imparting to the last a rearward movement of automatically determined extent relatively to said toe lasting means and presser to pull the clamped upper, said presser being shaped to engage the inner side of the rib of the insole about the toe to support the rib against the subsequent inward pressure of the wipers.

56. In a machine of the class described, toe lasting means comprising mechanism for clamping an upper about the toe of a last, means for positioning a last with its upper relatively to said toe lasting means comprising members for engaging the opposite sides of the forepart of the last to determine the lateral position of the toe end of the last, and means for imparting to the last a rearward movement relatively to said lasting means to pull the upper while the last is positioned by said members and for thereafter imparting to the last a heightwise movement relatively to the lasting means while maintaining the toe of the last in the lateral relation to the lasting means determined by said members.

57. In a machine of the class described, toe lasting means comprising mechanism for clamping the margin of an upper about the toe of a last, a toe rest, and means for imparting to the last a rearward movement relatively to said lasting means and toe rest to pull the clamped upper and for thereafter imparting to the last a heightwise movement relatively to the lasting means while mantaining the toe rest in clamping engagement with the top of the forepart of the upper.

58. In a machine of the class described, toe lasting means comprising mechanism for clamping an upper about the toe of a last, a yieldingly positioned toe rest, a jack for supporting a last with its upper and insole, means for operating said jack to impart to the last a rearward movement relatively to the lasting means and toe rest to pull the clamped upper, and means for thereafter imparting to the last a heightwise movement relatively to the lasting means against the resistance of said toe rest.

59. In a machine of the class described, the combination with means for shaping an upper over the toe of a last, of a member for engaging the upper frictionally on the top of the forepart, and means for imparting to the last a rearward movement relatively to said member in engagement with the upper to pull the upper forwardly on the last.

60. In a machine of the class described, toe lasting means comprising mechanism for clamping an upper about the toe of a last, a member for engaging the upper frictionally on the top of the forepart, and means for imparting to the last a rearward movement relatively to said member and clamping means to pull the upper forwardly on the last.

61. In a toe lasting machine, the combination with means for shaping an upper about the toe of a last and over the bottom face of an insole on the bottom of the last, of mechanism automatically operative in time relation to said upper shaping means to trim the upper about the toe while the upper is held in lasted relation to the insole.

62. In a toe lasting machine, the combination with wipers and means for operating them to wipe the margin of an upper inwardly over the feather and against the rib of an insole, of toe trimming means automatically operative in time relation to said wipers to trim the margin of the upper above the rib of the insole.

63. In a toe lasting machine, the combination with means for shaping an upper over the toe of a last and over an insole on the bottom of the last, of upper trimming mechanism comprising a rotary cutter having an automatically determined path of movement to trim the upper progressively about the toe while the upper is held in lasted relation to the insole.

64. In a toe lasting machine, the combination with wipers and means for operating them to wipe the margin of an upper inwardly over the feather and against the rib of an insole, of upper trimming means comprising a cutter and means for operating it to trim the margin of the upper above the rib of the insole while the upper is held by said wipers, said cutter having an automatically determined path of movement to cut outwardly through the margin of the upper at one side of the toe and then to trim the upper progressively round the toe to the other side.

65. In a toe lasting machine, the combination with means for shaping an upper about the toe of a last and over an insole on the bottom of the last, of a presser for engaging the insole and imparting to the last a heightwise movement relatively to the upper shaping means, and upper trimming means comprising a cutter mounted for movement with said presser in the heightwise movement of the last and for movement relatively to said presser to trim the upper about the toe.

66. In a toe lasting machine, the combination with means for shaping an upper about the toe of a last and over an insole on the bottom of the last, of a presser for engaging the insole and imparting to the last a heightwise movement relatively to the upper shaping means, and a cutter carried by said presser for trimming the margin of the upper about the toe.

67. In a toe lasting machine, the combination with means for shaping an upper about the toe of a last and inwardly against the rib of an insole on the bottom of the last, of a presser comprising a plate for engaging the insole on the forepart of the last, and upper trimming means comprising a cutter guided by said plate to trim the upstanding margin of the upper above the rib of the insole.

68. In a toe lasting machine, the combination with wipers for wiping an upper inwardly against the rib of an insole about the toe of a last, and an abutment for engaging the inner side of the rib of the insole about the toe to support the rib against the pressure of the wipers, of means mounted for movement in a predetermined path to trim the margin of the upper above the rib of the insole about the toe while the rib is supported by said abutment against the pressure of the wipers.

69. In a toe lasting machine, the combination with wipers for wiping the margin of an upper inwardly against the rib of an insole about the toe of a last, of a presser for engaging the insole on the forepart of the last comprising a member shaped to fit substantially inside of the rib of the insole to support the rib against the pressure of the wipers, and upper trimming means comprising a cutter positioned by said presser to trim the margin of the upper about the toe in predetermined relation to the rib of the insole.

70. In a machine of the class described, the combination with means for engaging an upper to shape it over the toe of a last, of means for engaging a side face of the forepart of the last to position the last relatively to the upper-shaping means, and means for imparting to the last, after it has been thus positioned, heightwise movement relatively to the upper-shaping means to shape the upper.

71. In a machine of the class described, the combination with means for engaging an upper to shape it over the toe of a last, of means for engaging a side face of the forepart of the last to position the last relatively to the upper-shaping means, and mechanism for imparting to the last heightwise movement relatively to the upper-shaping means to shape the upper and for holding the last from shifting laterally during said movement.

72. In a machine of the class described, the combination with toe-lasting means comprising wipers for wiping the toe end of an upper into lasted relation to an insole on a last, of means for engaging the opposite side faces of the forepart of the last to position the last relatively to the wipers.

73. In a machine of the class described, toe-lasting mechanism constructed to clamp an upper substantially in a plane about the toe end of a last from one side of the toe to the other side, and means for effecting relative movement of said toe-lasting mechanism and the last lengthwise of the last to pull the upper.

74. In a machine of the class described, the combination with means for working an upper over the toe of a last, of a device for engaging the upper on the top of the forepart, and mechanism automatically operative in time relation to the working of the upper over the toe to effect relative movement of said upper-engaging device and the last lengthwise of the last to work the upper forwardly on the last.

75. In a machine of the class described, the combination with a device for upwiping an upper about the toe of a last, and means for effecting relative movement of the last and said device to upwipe the upper, of a member for engaging the upper on the top of the forepart, and mechanism automatically operative in time relation to the upwiping operation to effect relative movement of said member and the last lengthwise of the last to work the upper forwardly on the last.

76. In a machine of the class described, forepart lasting mechanism comprising a device for engaging the upper of a shoe frictionally on the top of the forepart, and automatic means for effecting relative movement of said device and the shoe lengthwise of the shoe to work the upper forwardly on the last.

In testimony whereof I have signed my name to this specification.

WILLIAM C. BAXTER.